United States Patent
Pokorny et al.

(10) Patent No.: US 7,068,344 B2
(45) Date of Patent: *__Jun. 27, 2006__

(54) CHOLESTERIC LIQUID CRYSTAL OPTICAL BODIES AND METHODS OF MANUFACTURE AND USE

(75) Inventors: Richard J. Pokorny, Maplewood, MN (US); Marc D. Radcliffe, Newport, MN (US); Steven D. Solomonson, Shoreview, MN (US); Terence D. Spawn, West Lakeland Township, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/373,126

(22) Filed: Feb. 24, 2003

(65) Prior Publication Data

US 2004/0165140 A1    Aug. 26, 2004

(51) Int. Cl.
*G02F 1/1335* (2006.01)
*C09K 19/02* (2006.01)
(52) U.S. Cl. .................... 349/175; 349/96
(58) Field of Classification Search .......... 349/96–98, 349/175, 185
See application file for complete search history.

(56) References Cited

U.S. PATENT DOCUMENTS

| | | | |
|---|---|---|---|
| 4,293,435 A | 10/1981 | Portugall et al. | 252/299.01 |
| 4,412,059 A | 10/1983 | Krigbaum et al. | |
| 4,974,941 A | 12/1990 | Gibbons et al. | 349/24 |
| 5,032,009 A | 7/1991 | Gibbons et al. | 252/67 |
| 5,332,522 A | 7/1994 | Chen et al. | 252/299.01 |
| 5,389,698 A | 2/1995 | Chigrinov et al. | 522/2 |
| 5,442,025 A | 8/1995 | Spes | |
| 5,581,905 A | 12/1996 | Huelsman et al. | 34/421 |
| 5,602,661 A | 2/1997 | Schadt et al. | 349/124 |
| 5,691,789 A | 11/1997 | Li et al. | 349/958 |
| 5,694,701 A | 12/1997 | Huelsman et al. | 34/421 |
| 5,709,817 A | 1/1998 | Siemensmeyer et al. | |
| 5,744,057 A | 4/1998 | Meyer et al. | 252/299.01 |
| 5,759,449 A | 6/1998 | Shiro et al. | 252/582 |
| 5,780,629 A | 7/1998 | Etzbach et al. | 544/296 |
| 5,834,112 A | 11/1998 | Muraoka et al. | 428/332 |
| 5,838,407 A | 11/1998 | Chigrinov et al. | 349/117 |
| 5,847,068 A | 12/1998 | Maxein et al. | 528/69 |
| 5,886,242 A | 3/1999 | Etzbach et al. | 585/25 |
| 5,958,293 A | 9/1999 | Gibbons et al. | 252/299.4 |
| 5,958,305 A | 9/1999 | Shiro et al. | 252/585 |
| 5,969,055 A | 10/1999 | Nishikawa et al. | 525/419 |

(Continued)

FOREIGN PATENT DOCUMENTS

EP    0 834 754    3/1997

(Continued)

OTHER PUBLICATIONS

"Cholesteric Structure-I Optical Properties", J.L. Fergason, *Molecular Crystals*, Gordon and Breach Science Publishers, 1966, vol. 1, pp. 293-307.

(Continued)

*Primary Examiner*—Dung T. Nguyen
(74) *Attorney, Agent, or Firm*—Anna A. Kobilansky

(57) ABSTRACT

The method of making an optical body includes coating a mixture that includes a plurality of cholesteric liquid crystal compositions, and a solvent on a substrate. Each cholesteric liquid crystal composition is different. A plurality of layers is formed on the substrate. Each layer includes a majority of one of the cholesteric liquid crystal compositions.

26 Claims, 7 Drawing Sheets

U.S. PATENT DOCUMENTS

| | | | |
|---|---|---|---|
| 5,989,461 A | 11/1999 | Coates et al. | |
| 5,994,212 A | 11/1999 | Arakawa et al. | 438/617 |
| 6,001,277 A | 12/1999 | Ichimura et al. | 252/299.4 |
| 6,060,042 A | 5/2000 | Schuhmacher et al. | |
| 6,071,438 A | 6/2000 | Leigeber et al. | 252/585 |
| 6,106,743 A | 8/2000 | Fan | |
| 6,134,808 A | 10/2000 | Yapel et al. | 34/421 |
| 6,153,722 A | 11/2000 | Schoenfeld et al. | 252/299.01 |
| 6,159,654 A | 12/2000 | Machida et al. | 430/270.1 |
| 6,181,395 B1 * | 1/2001 | Li et al. | 349/98 |
| 6,309,561 B1 | 10/2001 | Hasegawa et al. | 252/299.61 |
| 6,312,769 B1 | 11/2001 | Hiraoka et al. | 428/1.1 |
| 6,316,170 B1 | 11/2001 | Kawamonzen et al. | 430/330 |
| 6,395,354 B1 | 5/2002 | Sahouani et al. | 428/1.2 |
| 6,473,143 B1 * | 10/2002 | Li et al. | 349/88 |
| 6,573,963 B1 * | 6/2003 | Ouderkirk et al. | 349/117 |
| 6,620,342 B1 | 9/2003 | Burchill et al. | 252/511 |
| 6,805,920 B1 | 10/2004 | Nakano | |
| 6,876,427 B1 | 4/2005 | Bowley | |
| 2002/0006479 A1 | 1/2002 | Sekine et al. | 428/1.1 |
| 2002/0113937 A1 | 8/2002 | Ouderkirk et al. | 349/187 |
| 2002/0159019 A1 * | 10/2002 | Pokorny et al. | 349/187 |
| 2002/0180912 A1 | 12/2002 | Pao-Ju et al. | 349/115 |
| 2003/0063245 A1 * | 4/2003 | Bowley et al. | 349/115 |
| 2003/0072893 A1 | 4/2003 | Nakano et al. | |

FOREIGN PATENT DOCUMENTS

| | | |
|---|---|---|
| EP | 0 881 509 | 5/1998 |
| EP | 0 908 745 | 10/1998 |
| EP | 1 072 649 A1 | 1/2001 |
| GB | 2 357 291 A | 6/2001 |
| JP | 08-166603 | 6/1996 |
| JP | H 9-133810 | 5/1997 |
| JP | H 9-304770 | 11/1997 |
| JP | H 10-54909 | 2/1998 |
| JP | H 10-142407 | 5/1998 |
| JP | 2001-213919 A | 8/2001 |
| JP | 2001-316668 A | 11/2001 |
| JP | 2001-318225 A | 11/2001 |
| JP | 2001-354733 A | 12/2001 |
| JP | 2001-354734 A | 12/2001 |
| WO | WO 97/35219 | 2/1997 |

OTHER PUBLICATIONS

"Cholesteric Structure-II Optical Properties", J.L. Fergason, N.N. Goldberg and R.J. Nadalin, *Molecular Crystals*, Gordon and Breach Science Publishers, 1966, vol. 1, pp. 309-323.

"A Broadband Circularly Polarized Film (CPF)", J.-S. Luh et al. *IDW*, pp. 529-532 (2002).

* cited by examiner

CHOLESTERIC LIQUID CRYSTAL OPTICAL BODIES AND METHODS OF MANUFACTURE AND USE

FIELD OF THE INVENTION

The present invention relates to optical bodies containing cholesteric liquid crystals. The present invention also relates to reflective optical polarizers formed by two or more layers of cholesteric liquid crystals or cholesteric liquid crystal precursors. Specifically, the invention relates to methods and apparatus for forming two or more cholesteric liquid crystal layers with a single coating composition on a substrate.

BACKGROUND OF THE INVENTION

Optical devices, such as polarizers and mirrors, are useful in a variety of applications including liquid crystal displays (LCD's). Liquid crystal displays fall broadly into two categories: backlit (e.g., transmissive) displays, where light is provided from behind the display panel, and frontlit (e.g., reflective) displays, where light is provided from the front of the display (e.g., ambient light). These two display modes can be combined to form transflective displays that can be backlit, for example, under dim light conditions or read under bright ambient light.

Conventional backlit LCDs typically use absorbing polarizers and can have less than 10% light transmission. Conventional reflective LCDs are also based on absorbing polarizers and typically have less than 25% reflectivity. The low transmission or reflectance of these displays reduces display contrast and brightness and can require high power consumption.

Reflective polarizers have been developed for use in displays and other applications. Reflective polarizers preferentially transmit light of one polarization and preferentially reflect light having an orthogonal polarization. It is preferred that reflective polarizers transmit and reflect light without absorbing relatively large amounts of the light. Preferably, the reflective polarizer has no more than 10% absorption for the transmission polarization. Many optical devices operate over a broad range of wavelengths and, as a consequence, the reflective polarizer must typically operate over that broad wavelength range, as well.

SUMMARY OF THE INVENTION

Generally, the present invention relates to optical bodies containing cholesteric liquid crystals and their manufacture, as well as the use of cholesteric liquid crystals in optical devices, such as reflective polarizers. Methods and apparatus for forming two or more cholesteric liquid crystal layers with a single coating composition on a substrate are described.

A method of making an optical body includes coating a mixture that includes a plurality of cholesteric liquid crystal compositions and a solvent on a substrate. Each cholesteric liquid crystal composition is different. A plurality of layers is formed on the substrate. Each layer includes a majority of one of the cholesteric liquid crystal compositions.

A further method of making an optical body includes coating a mixture including a first cholesteric liquid crystal composition, a second cholesteric liquid crystal composition, and a solvent on a substrate. The first cholesteric liquid crystal composition is different than the second cholesteric liquid crystal composition. A first layer and a second layer are formed on the substrate. The first layer includes a majority of the first cholesteric liquid crystal composition and the second layer includes a majority of the second cholesteric liquid crystal composition.

A further method of making an optical body includes coating a mixture including a first cholesteric liquid crystal composition, a second cholesteric liquid crystal composition, and a solvent on a substrate. The first cholesteric liquid crystal composition includes a cholesteric liquid crystal polymer and the second cholesteric liquid crystal composition includes a cholesteric liquid crystal monomer. A first layer and a second layer are formed from the mixture on the substrate. The first layer includes a majority of the first cholesteric liquid crystal composition and the second layer includes a majority of the second cholesteric liquid crystal composition.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
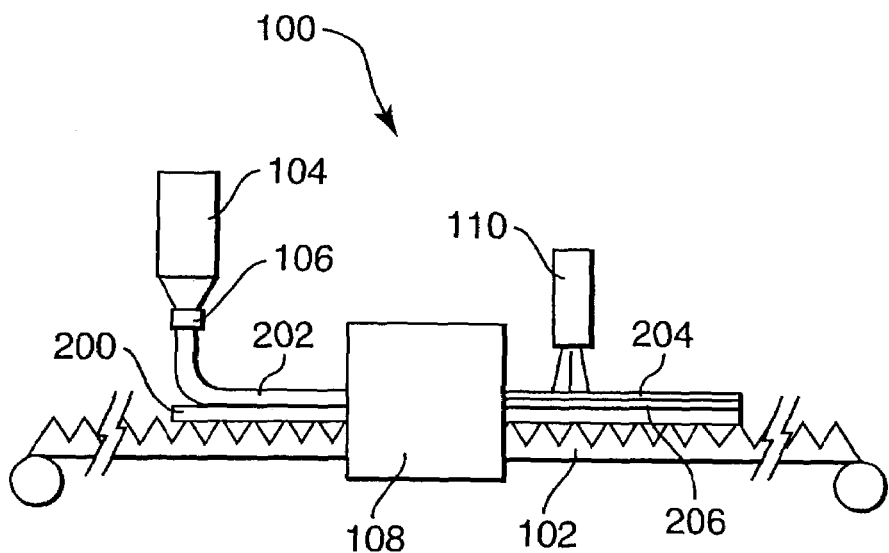
FIG. 1 is a schematic representation of one embodiment of a method and apparatus for forming two cholesteric liquid crystal layers with a single coating composition on a substrate, according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to optical bodies (such as optical films) and their manufacture, as well as the use of the optical bodies in optical devices, such as reflective polarizers and optical displays (e.g., liquid crystal displays). The present invention is also directed to optical bodies containing cholesteric liquid crystals. While the present invention is not so limited, an appreciation of various aspects of the invention will be gained through a discussion of the examples provided below.

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

The term "polymeric material" will be understood to include polymers, as defined above, and other organic or inorganic additives, such as, for example, antioxidants, stabilizers, antiozonants, plasticizers, dyes, and pigments.

The term "cholesteric liquid crystal composition" refers to a composition including, but not limited to, a cholesteric liquid crystal compound, a cholesteric liquid crystal polymer or a cholesteric liquid crystal precursor such as, for example, lower molecular weight cholesteric liquid crystal compounds including monomers and oligomers that can be reacted to form a cholesteric liquid crystal polymer.

The term a "mixture" refers to a heterogeneous association of substances that may or may not be uniformly dispersed including, for example, a solution, dispersion and the like.

The term a "chiral" unit refers to an asymmetrical unit containing a chiral unit, (e.g., unit that does not posses a mirror plane). A chiral unit is capable of rotating a plane of polarized light to either the left or the right in a circular direction.

The term a "mesogenic" unit refers to a unit having a geometrical structure that facilitates the formation of a liquid crystal mesophase.

The term a "nematic" liquid crystal compound refers to a liquid crystal compound that forms a nematic liquid crystal phase.

The term "solvent" refers to a substance that is capable of at least partially dissolving another substance (solute) to form a solution or dispersion. A "solvent" may be a mixture of one or more substances.

The term "chiral material" refers to chiral compounds or compositions, including chiral liquid crystal compounds and chiral non-liquid crystal compounds that can form or induce a cholesteric liquid crystal mesophase in combination with other liquid crystal material.

The term "polarization" refers to plane polarization, circular polarization, elliptical polarization, or any other non-random polarization state in which the electric vector of the beam of light does not change direction randomly, but either maintains a constant orientation or varies in a systematic manner. In plane polarization, the electric vector remains in a single plane, while in circular or elliptical polarization, the electric vector of the beam of light rotates in a systematic manner.

Reflective polarizers preferentially reflect light of one polarization and transmit the remaining light. In the case of reflective plane polarizers, light polarized in one plane is preferentially transmitted, while light polarized in the orthogonal plane is preferentially reflected. In the case of circular reflective polarizers, light circularly polarized in one sense, which may be the clockwise or counterclockwise sense (also referred to as right or left circular polarization), is preferentially transmitted and light polarized in the opposite sense is preferentially reflected. One type of circular polarizer includes cholesteric liquid crystal polarizers.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Cholesteric liquid crystal compounds generally include molecular units that are chiral in nature (e.g., molecules that do not possess a mirror plane) and molecular units that are mesogenic in nature (e.g., molecules that exhibit liquid crystal phases) and can be polymers. Cholesteric liquid crystal compositions may also include achiral liquid crystal compounds (nematic) mixed with or containing a chiral unit. Cholesteric liquid crystal compositions or materials include compounds having a cholesteric liquid crystal phase in which the director (the unit vector that specifies the direction of average local molecular alignmnent) of the liquid crystal rotates in a helical fashion along the dimension perpendicular to the director. Cholesteric liquid crystal compositions are also referred to as chiral nematic liquid crystal compositions. The pitch of the cholesteric liquid crystal composition or material is the distance (in a direction perpendicular to the director and along the axis of the cholesteric helix) that it takes for the director to rotate through 360°. This distance is generally 100 nm or more.

The pitch of a cholesteric liquid crystal material can be induced by mixing or otherwise combining (e.g., by copolymerization) a chiral compound with a nematic liquid crystal compound. The cholesteric phase can also be induced by a chiral non-liquid crystal material. The pitch may depend on the relative ratios by weight of the chiral compound and the nematic liquid crystal compound or material. The helical twist of the director results in a spatially periodic variation in the dielectric tensor of the material, which in turn gives rise to the wavelength selective reflection of light. For light propagating along the helical axis, Bragg reflection generally occurs when the wavelength, λ, is in the following range $$n_o p < \lambda < n_e p$$

where p is the pitch and $n_o$ and $n_e$ are the principal refractive indices of the cholesteric liquid crystal material. For example, the pitch can be selected such that the Bragg reflection is peaked in the visible, ultraviolet, or infrared wavelength regimes of light.

Cholesteric liquid crystal compounds, including cholesteric liquid crystal polymers, are generally known and typically any of these materials can be used to make optical bodies. Examples of suitable cholesteric liquid crystal polymers are described in U.S. Pat. Nos. 4,293,435, 5,332,522, 5,886,242, 5,847,068, 5,780,629, and 5,744,057, all of which are incorporated herein by reference. Other cholesteric liquid crystal compounds can also be used. A cholesteric liquid crystal compound may be selected for a particular application or optical body based on one or more factors including, for example, refractive indices, surface energy, pitch, processability, clarity, color, low absorption in the wavelength of interest, compatibility with other components (e.g., a nematic liquid crystal compound), molecular weight, ease of manufacture, availability of the liquid crystal compound or monomers to form a liquid crystal polymer, rheology, method and requirements of curing, ease of solvent removal, physical and chemical properties (for example, flexibility, tensile strength, solvent resistance, scratch resistance, and phase transition temperature), and ease of purification.

Cholesteric liquid crystal polymers are generally formed using chiral (or a mixture of chiral and achiral) molecules (including monomers) that can include a mesogenic group (e.g., a rigid group that typically has a rod-like structure to facilitate formation of a cholesteric liquid crystal phase). Mesogenic groups include, for example, para-substituted cyclic groups (e.g., para-substituted benzene rings). The mesogenic groups are optionally bonded to a polymer backbone through a spacer. The spacer can contain functional groups having, for example, benzene, pyridine, pyrimidine, alkyne, ester, alkylene, alkene, ether, thioether, thioester, and amide functionalities. The length or type of spacer can be altered to provide different properties such as, for example, solubilities in solvent(s).

Suitable cholesteric liquid crystal polymers include polymers having a chiral or achiral polyester, polycarbonate, polyamide, polyacrylate, polymethacrylate, polysiloxane, or polyesterimide backbone that include mesogenic groups optionally separated by rigid or flexible comonomers. Other suitable cholesteric liquid crystal polymers have a polymer backbone (for example, a polyacrylate, polymethacrylate, polysiloxane, polyolefin, or polymalonate backbone) with chiral and achiral mesogenic side-chain groups. The side-chain groups are optionally separated from the backbone by a spacer, such as, for example, an alkylene or alkylene oxide spacer, to provide flexibility.

To form a cholesteric liquid crystal layer, a cholesteric liquid crystal composition can be coated or otherwise disposed onto a surface. The cholesteric liquid crystal composition includes a chiral component containing at least one (i) chiral compound, (ii) chiral monomer that can be used (e.g., polymerized or crosslinked) to form a cholesteric liquid crystal polymer, or (iii) a combination thereof. The cholesteric liquid crystal composition can also include a non-chiral component that contains at least one (i) nematic liquid crystal compound, (ii) nematic liquid crystal monomer that can be used to form a nematic liquid crystal polymer, or (iii) a combination thereof. Together with the chiral component, the nematic liquid crystal compound(s) or nematic liquid crystal monomers can be used to modify the pitch of the cholesteric liquid crystal composition. The cholesteric liquid crystal composition can also include one or more additives, such as, for example, curing agents, crosslinkers, antiozonants, antioxidants, plasticizers, stabilizers, and ultraviolet, infrared, or visible light-absorbing dyes and pigments.

Cholesteric liquid crystal compositions can also be formed using two or more different types of any of the following: chiral compounds, achiral compounds, cholesteric liquid crystals, cholesteric liquid crystal monomers, nematic liquid crystals, nematic liquid crystal monomers, latent nematic or chiral nematic materials (in which the latent material exhibits the liquid crystal mesophase in combination with other materials), or combinations thereof. The particular ratio(s) by weight of materials in the cholesteric liquid crystal composition will generally determine, at least in part, the pitch of the cholesteric liquid crystal layer.

The cholesteric liquid crystal composition is generally part of a coating composition that may include a solvent(s). In some instances, one or more of the liquid crystals, liquid crystal monomers, processing additives, or any other component of the cholesteric liquid crystal composition may also act as a solvent. In some cases, the solvent can be substantially removed or eliminated from the coating composition by, for example, drying the composition to evaporate the solvent or reacting a portion of the solvent (e.g., reacting a solvating liquid crystal monomer to form a liquid crystal polymer) or by cooling below the processing temperature of the composition.

After coating, the cholesteric liquid crystal composition is converted into a liquid crystal layer or material. This conversion can be accomplished by a variety of techniques including evaporation of a solvent; heating; crosslinking the cholesteric liquid crystal composition; or curing (e.g., polymerizing) the cholesteric liquid crystal composition using, for example, heat, radiation (e.g., actinic radiation), light (e.g., ultraviolet, visible, or infrared light), an electron beam, or a combination of these or like techniques.

As a result of the coating and conversion to cholesteric liquid crystal materials, a cholesteric reflective polarizer that is effective over a wide range of wavelengths can be produced, if desired. In some embodiments, the cholesteric relective polarizer substantially reflects light over a spectral width of at least 100, 150, 200 or 300 nm or more measured as full width at half peak height of the reflection spectrum.

Optionally, initiators can be included within the cholesteric liquid crystal composition to initiate polymerization or crosslinking of monomeric components of the composition. Examples of suitable initiators include those that can generate free radicals to initiate and propagate polymerization or crosslinking. Free radical generators can also be chosen according to stability or half-life. Preferably the free radical initiator does not generate any additional color in the cholesteric liquid crystal layer by absorption or other means. Examples of suitable free radical initiators include thermal free radical initiators and photoinitiators. Thermal free radical initiators include, for example peroxides, persulfates, or azonitrile compounds. These free radical initiators generate free radicals upon thermal decomposition.

Photoinitiators can be activated by electromagnetic radiation or particle irradiation. Examples of suitable photoinitiators include, onium salt photoinitiators, organometallic photoinitiators, metal salt cationic photoinitiators, photodecomposable organosilanes, latent sulphonic acids, phosphine oxides, cyclohexyl phenyl ketones, amine substituted acetophenones, and benzophenones. Generally, ultraviolet (UV) irradiation is used to activate the photoinitiator, although other light sources can be used. Photoinitiators can be chosen based on the absorption of particular wavelengths of light.

An aligned cholesteric liquid crystal phase can be achieved using conventional treatments. For example, a method of developing a cholesteric liquid crystal phase includes depositing the cholesteric liquid crystal composition on an oriented substrate. The substrate can be oriented using, for example, drawing techniques or rubbing with a rayon or other cloth. Photoalignment orientated substrates are described in U.S. Pat. Nos. 4,974,941, 5,032,009, 5,389,698, 5,602,661, 5,838,407, and 5,958,293, all of which are incorporated herein by reference. After deposition, the cholesteric liquid crystal composition is heated above the glass transition temperature of the composition to the liquid crystal phase. The composition can be cooled into a glassy state and the composition remains in the liquid crystal phase.

Cholesteric liquid crystal compositions can be formed into a layer that substantially reflects light having one circular polarization (e.g., left or right circularly polarized light) and substantially transmits light having the other circular polarization (e.g., right or left circularly polarized light) over a particular bandwidth of light wavelengths. This characterization describes the reflection or transmission of light directed at normal incidence to the director of the cholesteric liquid crystal material. Light that is directed at other angles will typically be elliptically polarized by the cholesteric liquid crystal material and the Bragg reflection peak is typically blue-shifted from its on-axis wavelength. Cholesteric liquid crystal materials are generally characterized with respect to normally incident light, as done below, however, it will be recognized that the response of these materials can be determined for non-normally incident light using known techniques.

Optical bodies can be formed by disposing at least one cholesteric liquid crystal material on a substrate. The surface of the substrate (e.g., the surface of an alignment layer provided as part of the substrate) has a surface alignment feature that can improve or provide uniformity of alignment of the cholesteric liquid crystal material disposed thereon. A surface alignment includes any surface features that produce alignment of the director of the liquid crystal material at that surface. Surface alignment features can be produced by a variety of different methods including, for example, unidirectional rubbing of the substrate, stretching the substrate, or photoalignment of a photopolymerizable material by light, among others.

The substrate can provide a base for deposition or formation of an optical body or structure including the various cholesteric liquid crystal compounds. The substrate can be a structural support member during manufacture, use or both. The substrate may be transparent over the wavelength range of operation of the optical body. Examples of substrates include cellulose triacetate (TAC, available from, for, example, Fuji Photo Film Co., Tokyo, Japan; Konica Corporation, Toyko, Japan; and Eastman Kodak Co., Rochester, N.Y.), Sollx™ (available from General Electric Plastics, Pittsfield, Mass.), and polyesters, such as polyethylene terphathalate (PET). In some embodiments, the substrate is non-bifringent.

The substrate can have more than one layer. In one embodiment, the substrate contains an alignment layer having a surface capable of orienting a liquid crystal composition disposed on the alignment layer in a fairly uniform direction. Alignment layers can be made using mechanical or chemical method. Mechanical methods of making an alignment layer include, for example, rubbing or stretching a polymer layer in the desired alignment direction. For example, polyvinyl alcohol, polyamide, and polyimide films can be aligned by rubbing the film in the desired alignment direction. Films that can be aligned by stretching include, for example, polyvinyl alcohol, polyolefins such as, for example, polyethylene or polypropylene, polyesters such as, for example, polyethylene terphthalate or polyethylene naphthalate, and polystyrene. The polymer film can be a homopolymer, a copolymer, or a mixture of polymers.

An alignment layer can be formed photochemically. For example, photo-orientable polymers can be formed into alignment layers by irradiation or anisotropically absorbing molecules disposed in a medium or on a substrate with light (e.g., ultraviolet light) that is linearly polarized relative to the desired alignment direction, as described in U.S. Pat. Nos. 4,974,941, 5,032,009, and 5,958293, all of which are incorporated herein by reference. Suitable photo-orientable polymers include polyimides including, for example, substituted 1,4-benzenediamines.

Another class of photoalignment materials can be used to form alignment layers. These polymers selectively react in the presence of polarized ultraviolet light along or perpendicular to the direction of the electric field vector of the polarized ultraviolet light, which once reacted, have been shown to align liquid crystal compositions or materials. Examples of these materials are described, for example, in U.S. Pat. Nos. 5,389,698, 5,602,661, and 5,838,407, all of which are incorporated herein by reference.

Photoisomerizable compounds such as, for example, azobenzene derivatives are also suitable for photoalignment, as described in U.S. Pat. No. 6,001,277, incorporated herein by reference. Alignment layers can also be formed by coating certain types of lyotropic molecules which orient due to shear applied during coating. Molecules of this type are disclosed, for example, in U.S. Pat. No. 6,395,354, herein incorporated by reference.

The optical bodies can be combined with other optical or physical elements. In one, embodiment, a triacetyl cellulose (TAC) film can be attached to the optical body using an adhesive. In another embodiment, a laminate can be formed using the substrate and another polymer film. In one embodiment, a TAC or quarter wave film can be laminated to the substrate. Alternatively, the TAC or quarter wave film can be laminated to a layer containing the cholesteric liquid crystal material. The quarter wave film can convert the transmitted circularly polarized light to linearly polarized light. After passing through a quarter wave film, circularly polarized light is converted into linearly polarized light with its polarization axis + or −45 degrees away from the optical axis of the quarter wave film, with the direction determined by the specific circular polarization state. In another embodiment, the substrate itself can be a quarter wave film.

The cholesteric liquid crystal layer can be used alone or in combination with other layers or devices to form an optical body, such as, for example, a reflective polarizer. Cholesteric liquid crystal polarizers are used in one type of reflective polarizer. The pitch of a cholesteric liquid crystal polarizer is similar to the optical layer thickness of multilayer reflective polarizers. Pitch and optical layer thickness respectively determine the center wavelength of the cholesteric liquid crystal polarizers and multilayer reflective polarizers. The rotating director of the cholesteric liquid crystal polarizer forms optical repeat units similar to the multiple layers in multilayer reflective polarizers having the same optical layer thickness.

The center wavelength, $\lambda_0$, and the spectral bandwidth, $\Delta\lambda$, of the light reflected by the cholesteric liquid crystal layer depend on the pitch, p, of the cholesteric liquid crystal. The center wavelength, $\lambda_0$, is approximated by:

$$\lambda_0 = 0.5(n_o + n_e)p$$

where $n_o$ and $n_e$ are the refractive indices of the cholesteric liquid crystal for light polarized parallel to the director of the liquid crystal ($n_e$) and for light polarized perpendicular to the director of the liquid crystal ($n_o$). The spectral bandwidth, $\Delta\lambda$, is approximated by:

$$\Delta\lambda = 2\lambda_0(n_e - n_o)/(n_e + n_o) = p(n_e - n_o).$$

When the birefringence of the material ($n_e - n_o$) is $\leq 2$, the spectral bandwidth or width (measured as full width at half peak height) of a cholesteric liquid crystal composition is generally 100 nm or less. This limits the usefulness of a cholesteric liquid crystal polymer when reflectivity over the entire visible light range (400 to 750 nm) or other wavelength range substantially larger than 100 nm is desired.

To make a reflective polarizer capable of reflecting a broad range of wavelengths, multiple pitch lengths can be used. Broadband cholesteric liquid crystal polarizers have been previously formed by laminating or otherwise stacking two separately-formed cholesteric liquid crystal coatings, each disposed on an individual substrate, with different pitches (e.g., having different compositions, for example, different ratios by weight of chiral and nematic liquid crystal components). Each layer has a different pitch and, therefore, reflects light having a different wavelength.

With a sufficient number of layers, a polarizer can be constructed that reflects a large portion of the visible light spectrum. These constructions tend to have a non-uniform transmission or reflection spectra because each layer reflects a different region of light. The uniformity can be improved somewhat by allowing some diffusion of the liquid crystals between the various layers during construction. These layers can be heated to diffuse some liquid crystal material between the layers. This can result in an averaging of the pitches between the various layers.

This method, however, requires a substantial number of processing steps including separately forming each layer (e.g., individually drying or curing each layer), stacking (e.g., laminating) the layers, and then heating the layers to cause diffusion of liquid crystal material between the two layers. This also requires substantial processing time, particularly, in view of the time required for diffusion between the two previously formed liquid crystal layers which are typically polymeric in nature.

New techniques for making cholesteric liquid crystal optical bodies have been developed. These techniques include solvent and material selection to facilitate forming two or more cholesteric liquid crystal layers on a substrate from a single coating composition.

A new method of forming cholesteric liquid crystal bodies includes forming two or more cholesteric liquid crystal layers from a single coating composition, each of the cholesteric liquid crystal layers may have different optical properties. After coating a substrate with the coating composition a first and second layer may be formed within the coating composition. The first and second layers are converted into aligned cholesteric liquid crystal materials or layers where each layer has different optical properties. The single coating composition includes one or more solvent(s) and two or more cholesteric liquid crystal compositions that are at least partly soluble in the solvent(s).

The method of the invention can form any number of odd or even number of layers with different optical properties. Optical properties that can differ include, for example, pitch, effective pitch (defined as $p[n_e + n_o]/2$), and handedness.

While not wishing to be bound by any particular theory, it is believed that a driving force for forming at least two layers having different optical properties from a single composition involves the incompatibility of the two or more cholesteric compositions. This incompatibility can be investigated by the chi interaction parameter, interfacial tension, solubility parameter, or surface tension measurements. Any of these will be useful for characterizing liquid crystal materials that will phase separate. In order to form two or more layers, incompatibility is often not, by itself, sufficient. In addition to having incompatible cholesteric materials, those materials should form layers. Layer formation may depend on many factors including, but not limited to, viscosity, phase transition temperatures, solvent compatibility, molecular weight of the materials, difference in surface tension, cholesteric liquid crystal phase morphology, and temperature of the components. For example, it can be useful for a top layer to have a lower surface tension than a lower layer to help drive the material of the top layer to the top surface. In addition or in the alternative, it can be helpful to form the top layer at a temperature high enough so that it is in the nematic phase. It can also be useful for the top layer to have a relatively low viscosity at this temperature in order to reduce the time for phase separation to occur. It can also be useful for the polymer layer (which may be the lower layer) to have sufficiently low viscosity to provide for enhanced mobility of the components. Consolidation and reduction of interfacial surface area can be driving forces for the layer formation. A low viscosity for the polymer may be accomplished, if desired, by control of its composition, molecular weight, temperature, solvent balance, plasticizer content, or any combination thereof.

Other processes, materials, or processing conditions can be used to enhance layer formation. For example, if two different solvents with different compatibilities for the cholesteric materials are used, as one solvent evaporates, one material will form a layer while the other remains in solution. Or materials with very different nematic transition temperatures can be used so that one material is in its (relatively) low viscosity nematic phase while the other is in a more viscous amorphous phase. Alternatively, one material could be cured that may increase its viscosity and force the second material to the surface. Molecular weight differences can also be used. If two incompatible cholesteric polymers are formed with different molecular weights, than they will typically have very different viscosities, which will generally enhance layer formation. Temperature can also be varied during the layer formation process. First, the temperature can be above the nematic transition temperature of one cholesteric compound but less than the nematic transition temperature of a second cholesteric compound. This will help the first material to form a cholesteric phase layer. Then the temperature can be raised above the nematic transition temp of the second cholesteric compound so that material will form its cholesteric phase layer.

Another helpful factor can be if the cholesteric compositions form glasses (super cooled liquid crystal phases) upon cooling from the nematic phase versus crystalline phases. Using cholesteric polymers instead of monomers helps to encourage glass formation. An alternative to glass formation is to quickly cure the monomers while they are still in their layered cholesteric phase (at elevated temperatures) this helps to maintain the nematic phase of the two layers.

In one embodiment, the first cholesteric liquid crystal composition includes a chiral liquid crystal polymer or a mixture of chiral and achiral liquid crystal polymers; the second cholesteric liquid crystal composition includes a chiral liquid crystal monomer or a mixture of chiral and achiral liquid crystal monomers. The first cholesteric liquid crystal composition may be partially or fully polymerized. The first cholesteric liquid crystal composition may form a thermoplastic layer. The second cholesteric liquid crystal composition can be cross-linked to form a cholesteric liquid crystal material. The second cholesteric liquid crystal composition may be further cured. It is understood the materials for the first and second liquid crystal compositions are interchangeable and any combination of material or solvent achieving separation of one cholesteric material from another cholesteric material is within the scope of this invention.

The coating composition can be disposed on the substrate using any technique, such as any coating technique. Removal of at least a portion of the solvent from the coating composition may cause the first cholesteric liquid crystal composition to separate from the second cholesteric liquid crystal compound. Each layer formed from the single coating mixture or composition can be formed of a majority of one of the cholesteric liquid crystal compositions, thus providing each separate layer with unique optical properties.

A transition region at the interface between the first cholesteric liquid crystal layer and the second cholesteric liquid crystal layer can be formed. A first cholesteric liquid crystal compound concentration gradient may form in the second cholesteric liquid crystal layer where the concentration gradient changes through the transition region. Likewise, a second cholesteric liquid crystal compound concentration gradient may form in the first cholesteric liquid crystal layer where the concentration gradient changes through the transition region. The ability to form at least two distinct cholesteric liquid crystal layers with a single coating composition and process reduces the complexity and number of processing steps required to form an optical body.

In one embodiment, heating can both remove solvent and anneal or align the cholesteric liquid crystal layers. Alternatively, solvent removal and annealing can be performed separately. The cholesteric liquid crystal layers align with different pitches or effective pitches so that a broad range of the light spectrum is covered.

A second coating composition that includes a single cholesteric liquid crystal composition can be disposed on the first and second cholesteric liquid crystal layers. Each of the three layers may alternate between thermoplastic material and cross-linked material.

Alternatively, a second coating composition with a composition and properties similar to or different from the first coating composition described above and the ability to create at least two cholesteric liquid crystal layers (as described above for the first coating composition) can be applied to the first and second cholesteric liquid crystal layers. The pitch of each layer may be different to provide coverage over the visible light spectrum. This second coating composition can provide a third and fourth cholesteric liquid crystal layer disposed on the first and second cholesteric liquid crystal layers. Each of the four layers may alternate between a thermoplastic material and a cross-linked material.

The first or second cholesteric liquid crystal composition may include a reactive monomer material that can crosslink, in addition to polymerize. This reactive monomer material may be a reactive chiral monomer and, in some embodiments is a cholesteric liquid crystal compound, a precursor for a cholesteric liquid crystal polymer, or a chiral compound. For example, the reactive monomer material can be, for example, a di(meth)acrylate, an epoxy-acrylate, a diepoxide, a divinyl, a diallyl ether or other reactive material. This "fixes" the cholesteric liquid crystal layer(s) and prevents or substantially reduces any movement of material within the layer(s).

This method and configuration has advantages over previous techniques, in which each layer had been formed sequentially and separately and then used heat-induced diffusion to mix portions of cholesteric liquid crystal polymer layers. In these prior techniques, the resulting product would continue to experience diffusion between layers of different composition over time, particularly when the product was utilized in an application with substantial heat production, such as many display applications. This continued diffusion resulted in changes in the optical properties of the product over time.

In contrast, the technique disclosed herein for cross-linking the cholesteric liquid crystal layer(s) provides a method for substantially reducing or preventing further movement after crosslinking by increasing molecular weight and reducing the availability of mobile monomer materials for diffusion or movement. Thus, the optical properties of the resulting optical body can be substantially stable over time and can be used to produce a more reliable product with a longer lifetime. In addition, when the first cholesteric liquid crystal composition is incompatible with the second cholesteric liquid crystal composition they tend to try to move away from each other as solvent is removed thus, both the incompatibility effects and the cross-linking provide an optical body that is substantially stable over time and can be used to produce a more reliable product with a longer lifetime as compared to prior art optical bodies.

The methods described above can be performed using a variety of techniques and equipment. FIG. 1 illustrates an example of a suitable method and device for accomplishing forming two cholesteric liquid crystal layers with a single coating composition onto a substrate. A coating apparatus 100 includes a carrier (e.g., a conveyor belt or a sliding platform) that conveys the substrate 200 past a first coating dispenser 104. Alternatively, the substrate 200 can be a continuous web that is pulled through the apparatus 100 through use of drive rolls. The use of drive rolls, or a similar mechanism, for moving the substrate 200 and one or more coating layers can eliminate the necessity for a carrier 102, located underneath the substrate 200. The first coating composition 202 is dispensed through a first coating head 106 and onto the substrate 200. Any coating technique can be used including, for example, knife coating, bar coating, slot coating, gravure coating, roll coating, spray coating, or curtain coating. In one embodiment, the first coating composition 202 includes a solvent and two or more cholesteric liquid crystal compositions that are at least partly soluble in the solvent.

In one embodiment, the first cholesteric liquid crystal composition includes a chiral liquid crystal polymer or a mixture of chiral and achiral liquid crystal polymers; the second cholesteric liquid crystal composition includes a chiral liquid crystal monomer or a chiral and an achiral liquid crystal monomer. The first cholesteric liquid crystal composition may be partially or fully polymerized. The first cholesteric liquid crystal composition may form a thermoplastic layer. The second cholesteric liquid crystal composition can be polymerized to form a cholesteric liquid crystals material. The second cholesteric liquid crystal composition may form a cross-linked layer.

The first coating composition 202 and substrate 200 can pass through a drying oven 108 to remove solvent. Removal of at least a portion of the solvent from the coating composition 202 causes the first cholesteric liquid crystal composition to separate from the second cholesteric liquid crystal composition forming a first layer 206 and a second layer 204.

The first coating composition 202 and/or first layer 206 and a second layer 204 and substrate 200 can pass through a curing station 110 containing, for example, a heat or light source to cure (partially or fully) the first coating composition and/or first layer 206 and second layer 204, if the composition 202 and/or first layer 206 and second layer 204 contains curable components and it is desired to cure those components at this stage of the process. The curing station 110 can be placed at one or more various positions relative to the position of the substrate 200.

Figure 2:
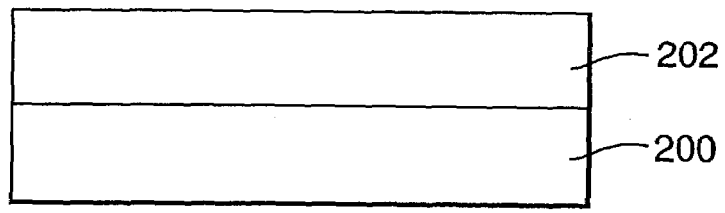
FIG. 2 is a schematic representation of a cross-section of a first coating composition on a substrate, according to the invention.
Figure 3:
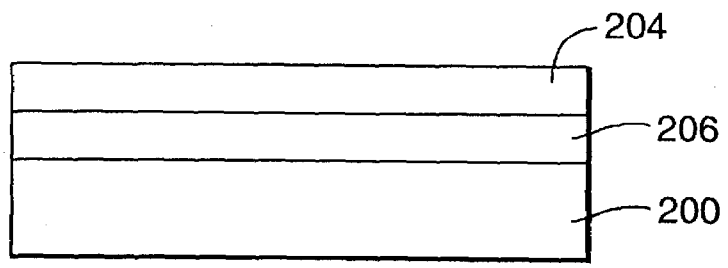
FIG. 3 is a schematic representation of a cross-section of first and second cholesteric liquid crystal material layers on a substrate, according to the invention.

FIGS. 2 to 3 illustrate various stages of the method illustrated by FIG. 1. In one embodiment of the invention, as illustrated in FIG. 2, the first coating composition 202 is applied to the substrate 200. The first coating composition 202 includes, in a suitable solvent, a first cholesteric liquid crystal composition such as, a polymeric liquid crystal composition, and a second cholesteric liquid crystal composition such as, a monomeric liquid crystal composition, that are compatible or soluble in the solvent forming a mixture and incompatible or insoluble when solvent is removed from the mixture.

FIG. 3 illustrates the formed optical body where the first cholesteric liquid crystal composition has separated from the second cholesteric liquid crystal composition following drying 108 and/or curing 110. The first cholesteric liquid crystal composition may form a first layer 206 disposed on the substrate 200. The second cholesteric liquid composition may form a second layer 204 disposed on top of the first layer 206. The first layer 206 and second layer 204 may have the same or different thickness. The relative thickness of each layer 206, 204 can be pre-determined by controlling one of these variables: for example, by choice of materials, relative amounts of materials; temperature, viscosity, polymer molecular weight, or a combination of these variables. The thickness of first layer 206 and the second layer 204 can be any thickness. The thickness of the first layer 206 and the second layer 204 can be independently selected from 1 to 10 micrometers or 2 to 5 micrometers or 3 to 4 micrometers for visible light and thicker for IR light, for example.

The first layer 206 may contains cholesteric liquid crystal compositions that once aligned, cover a portion of light spectrum not covered with the second layer 204. For example, the first layer 206 may reflect red, blue, green or yellow visible light and the second layer 204 may reflect a color of visible light that is not reflected by the first layer 206. Specifically, the first layer 206 may reflect blue visible light and the second layer 204 may reflect red visible light.

Figure 4:
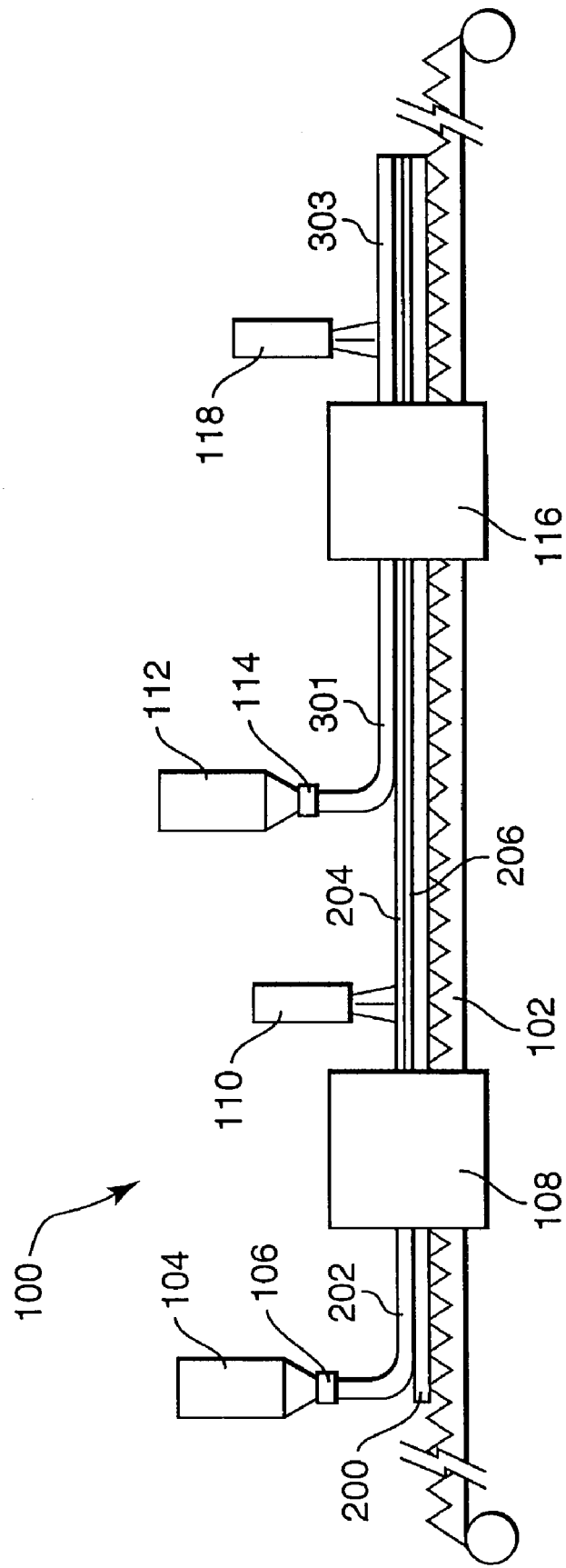
FIG. 4 is a schematic representation of one embodiment of a method and apparatus for forming two cholesteric liquid crystal layers with a single coating composition onto a substrate and sequentially forming another cholesteric liquid crystal layer onto the first two cholesteric liquid crystal layers, according to the invention.

FIG. 4 illustrates an example of a suitable method and device for forming three cholesteric liquid crystal layers with two coating compositions. The first two cholesteric liquid crystal layers can be formed as described in accordance with FIG. 1; a second coating dispenser 112 then dispenses a second coating composition 301 through a second coating head 114 onto the second layer 204. Again, any coating technique can be used. In one embodiment, the second coating composition 301 includes a solvent and a third cholesteric liquid crystal composition.

The second coating composition 301 and substrate 200 can pass through a drying oven 116 to remove solvent forming a third layer 303. The second coating composition 301 and/or third layer 303 and substrate 200 can be passed through a curing station 118 containing, for example, a heat or light source to polymerize (partially or fully) the second coating composition and/or third layer 303, if the composition 302 and/or third layer 306 contain curable components and it is desired to cure those components at this stage of the process. The curing station 118 can be placed at one or more various positions relative to the position of the substrate 200 and second coating composition 302 and/or third layer 306 and fourth layer 304.

The second coating composition 301 may contains cholesteric liquid crystal compositions that once aligned, cover a portion of light spectrum not covered with the first two layers 204, 206. For example, the third layer 303 may reflect red, blue, green or yellow visible light and the second layer 204 may reflect a color of visible light that is not reflected by the third layer 303 and the first layer 206 may reflect a color of visible light that is not reflected by either the third layer 303 or the second layer 204. Specifically, the first layer 206 may reflect blue visible light and the second layer 204 may reflect red visible light and the third layer 303 may reflect green visible light.

Figure 5:
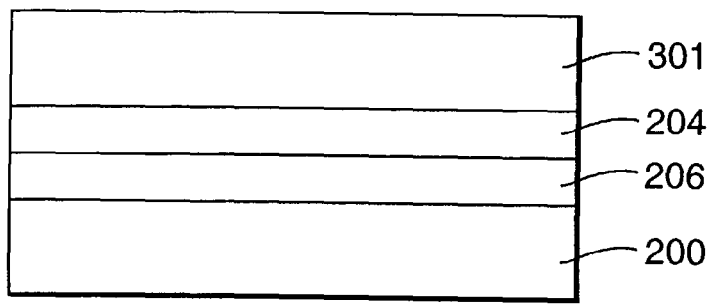
FIG. 5 is a schematic representation of a cross-section of a second coating composition on first and second cholesteric liquid crystal material layers on a substrate, according to the invention.
Figure 6:
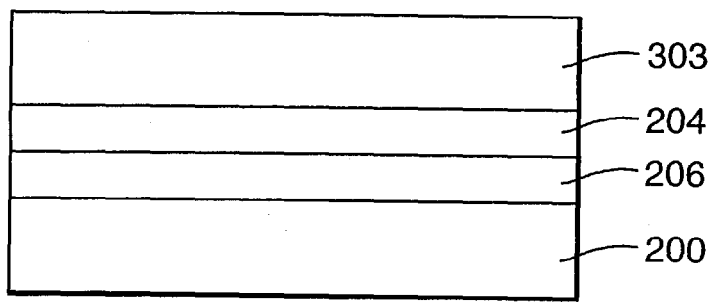
FIG. 6 is a schematic representation of a cross-section of a third cholesteric liquid crystal material layer on first and second cholesteric liquid crystal material layers on a substrate, according to the invention.

FIGS. 5 to 6 illustrate various stages of the method illustrated by FIG. 4. In one embodiment of the invention, as illustrated in FIG. 5, the second coating composition 301 is applied to the first layer 206 and second layer 204 on the substrate 200. The second coating composition 301 includes, in a suitable solvent, a third cholesteric liquid crystal composition such as, a polymeric or monomeric liquid crystal material soluble in the solvent. FIG. 6 illustrates the third layer 303 following alignment of the third cholesteric liquid crystal composition.

Figure 7:
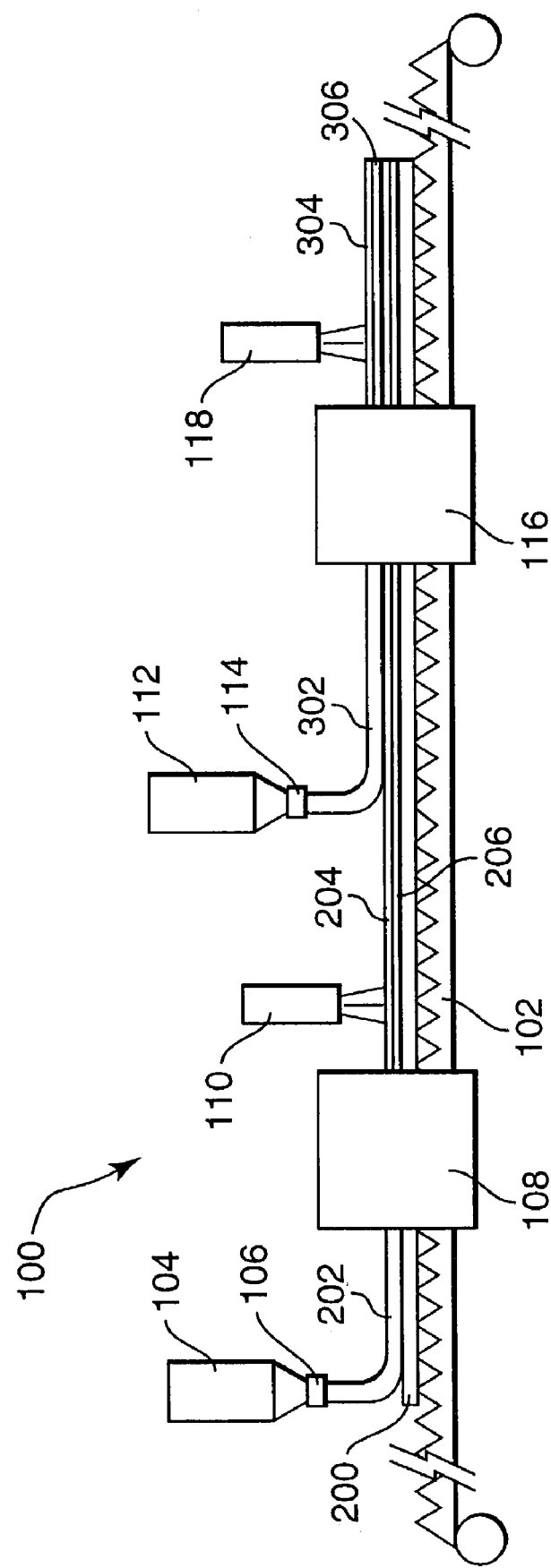
FIG. 7 is a schematic representation of one embodiment of a method and apparatus for forming two cholesteric liquid crystal layers with a single coating composition onto a substrate and sequentially forming a second two cholesteric liquid crystal layers with a second single coating composition onto the first two cholesteric liquid crystal layers, according to the invention.

FIG. 7 illustrates an example of a suitable method and device for forming four cholesteric liquid crystal layers with two coating compositions. The first two cholesteric liquid crystal layers can be formed as described in accordance with FIG. 1; a second coating dispenser 112 then dispenses a second coating composition 302 through a second coating head 114 onto the second layer 204. Again, any coating technique can be used. In one embodiment, the second coating composition 302 includes a solvent and two or more cholesteric liquid crystal compounds that are at least partly soluble in the solvent.

In one embodiment, the third cholesteric liquid crystal composition includes a chiral liquid crystal polymer or a chiral and an achiral liquid crystal polymer; the fourth cholesteric liquid crystal composition includes a chiral liquid crystal monomer or a chiral and an achiral liquid crystal monomer. The third cholesteric liquid crystal composition may be partially or fully polymerized. The third cholesteric liquid crystal composition may form a thermoplastic layer.

The fourth cholesteric liquid crystal composition can be cured or cross-linked to form a cholesteric liquid crystals material. The fourth cholesteric liquid crystal composition may form a cross-linked layer.

The third coating composition 302 and substrate 200 can pass through a drying oven 116 to remove solvent. Removal of at least a portion of the solvent from the coating composition 302 causes the third cholesteric liquid crystal composition to separate from the fourth cholesteric liquid crystal composition forming a third, layer 306 and a fourth layer 304.

The second coating composition 302 and/or third layer 306 and a fourth layer 304 and substrate 200 can be passed through a curing station 118 containing, for example, a heat or light source to cure (partially or fully) the second coating composition and/or third layer 306 and fourth layer 304, if the composition 302 and/or third layer 306 and fourth layer 304 contains curable components and it is desired to cure those components at this stage of the process. The curing station 118 can be placed at one or more various positions relative to the position of the substrate 200.

The second coating composition 302 may contains cholesteric liquid crystal compounds that once aligned, cover a portion of light spectrum not covered with the first two layers 204, 206.

After a desired degree of mass transfer is achieved, the coating compositions may be fully cured using a curing station 118 including, for example, a light or heat source. In one embodiment, as described above, the coating compositions include a material that can crosslink the materials "fixing" the cholesteric liquid crystal materials within that layer.

Figure 8:
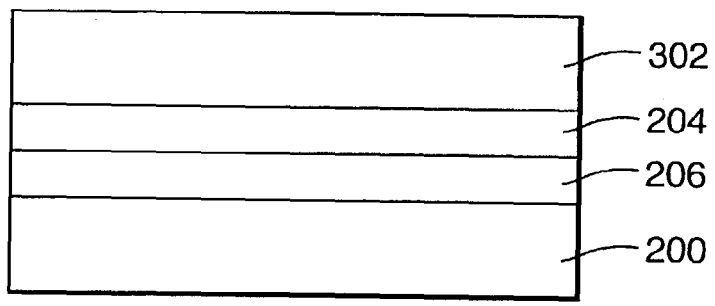
FIG. 8 is a schematic representation of a cross-section of a second coating composition on first and second cholesteric liquid crystal material layers on a substrate, according to the invention.
Figure 9:
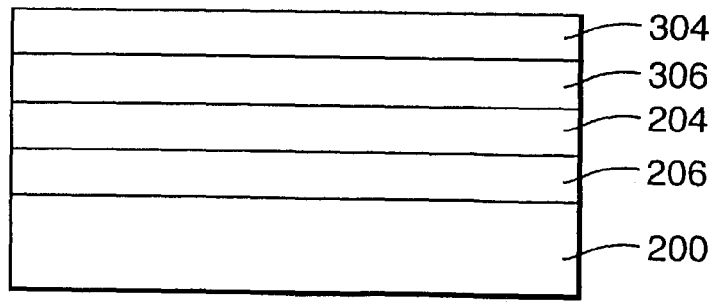
FIG. 9 is a schematic representation of a cross-section of third and fourth cholesteric liquid crystal material layers on first and second cholesteric liquid crystal material layers on a substrate, according to the invention.

FIGS. 8 to 9 illustrate various stages of the method illustrated by FIG. 7. In one embodiment of the invention, as illustrated in FIG. 8, the second coating composition 302 is applied to the first layer 206 and second layer 204 on the substrate 200. The second coating composition 302 includes, in a suitable solvent, a third cholesteric liquid crystal composition such as, a polymeric liquid crystal composition, and a fourth cholesteric liquid crystal composition such as, a monomeric liquid crystal composition, that are compatible or soluble in the solvent forming a solution and incompatible or insoluble when solvent is removed from the solution.

FIG. 9 illustrates the formed optical body where the third cholesteric liquid crystal composition has separated form the fourth cholesteric liquid crystal composition following drying 116 and curing 118. The third cholesteric liquid crystal composition may form a third layer 306 disposed on the second layer 204. The fourth cholesteric liquid composition may form a fourth layer 304 disposed on top of the third layer 306.

The second coating composition 302 may contains cholesteric liquid crystal compositions that once aligned, cover a portion of light spectrum not covered with the first two layers 204, 206. For example, the fourth layer 304 may reflect red, blue, green or yellow visible light and the third layer 306 may reflect a color of visible light that is not reflected by the fourth layer 304. Specifically, the first layer 206 may reflect blue visible light and the second layer 204 may reflect red visible light and the third layer 306 may reflect green visible light and the fourth layer 304 may reflect yellow visible light.

The third layer 306 and fourth layer 304 may have the same or different thickness as described above.

The speed of the substrate 200 can also be controlled to change the duration of treatment by the ovens 108/116 or curing stations 110/118. The duration of treatment by the oven 108/116 may be any length of time such as, for example, 1 to 30 minutes or 1 to 15 minutes or 3 to 10 minutes or 3 to 6 minutes. The oven temperature may be high enough to vaporize the solvent or above the nematic transition temperature and low enough to prevent degradation of the materials within the optical body. The oven temperature may be at least 75° C. or from 80° C. to 140° C. or 100° C. to 120° C.

The rate of mass transfer from a single layer into two separate layers depends upon a variety of factors including, for example, the specific materials used in each composition, the percentages of materials in these compositions, the molecular weight of the materials, the temperature of the compositions, the remaining solvents, the viscosity of the compositions, and the degree of polymerization of each composition. A desired mass transfer rate can be obtained by controlling one or more of these variables, for example, by choice of materials, temperature, viscosity, polymer molecular weight, or any combination of these variables. The coating compositions may be placed in an oven 108/116 or other heating unit to increase the mass transfer rate of the liquid crystal compositions away from each other into two separate distinct layers and the mass transfer rate of solvent leaving the coating compositions 202, 302. This oven can also be used to partially or fully remove the solvents from the coating compositions, if desired.

The devices and methods illustrated in FIG. 1 to FIG. 9 can be modified to sequentially coat more than two coating compositions onto a substrate. For example, additional coating dispensers, ovens, or light sources can be added to the apparatus. In addition, the number of ovens or curing stations can be increased or decreased to optimize the overall process of forming an optical body.

As an example, a broadband reflective polarizer can be formed according to the methods and configurations described herein. This broadband reflective polarizer can substantially uniformly (e.g., with no more than 10% or 5% variation) reflect light of one polarization over a wavelength range of 100 nm, 200 nm, or 300 nm or more. In particular, a broadband reflective polarizer can be formed that substantially uniformly reflects light of one polarization over the visible wavelength range (e.g., from 400 to 750 nm).

Figure 10:
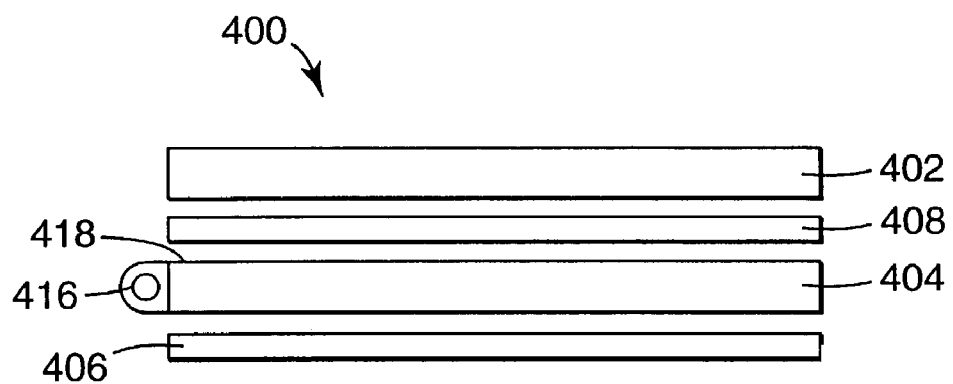
FIG. 10 is a schematic illustration of one embodiment of a liquid crystal display, according to the invention.

The cholesteric liquid crystal optical bodies can be used in a variety of optical displays and other applications, including transmissive (e.g., backlit), reflective, and transflective displays. For example, FIG. 10 illustrates a schematic cross-sectional view of one illustrative backlit display system 400 including a display medium 402, a backlight 404, a cholesteric liquid crystal reflective polarizer 408, as described above, and an optional reflector 406. The display system optionally includes a quarter wave plate as part of the cholesteric liquid crystal reflective polarizer or as a separate component to convert the circularly polarized light from the liquid crystal reflective polarizer to linearly polarized light. A viewer is located on the side of the display device 402 that is opposite from the backlight 404.

The display medium 402 displays information or images to the viewer by transmitting light that is emitted from the backlight 404. One example of a display medium 402 is a liquid crystal display (LCD) that transmits only light of one polarization state.

The backlight 404 that supplies the light used to view the display system 400 includes, for example, a light source 416 and a light guide 418, although other backlighting systems can be used. Although the light guide 418 depicted in FIG. 10 has a generally rectangular cross-section, backlights can use light guides with any suitable shape. For example, the light guide 418 can be wedge-shaped, channeled, a pseudo-wedge guide, etc. The primary consideration is that the light guide 418 be capable of receiving light from the light source 416 and emitting that light. As a result, the light 418 can include back reflectors (e.g., optional reflector 406), extraction mechanisms and other components to achieve the desired functions.

The reflective polarizer 408 is an optical film that includes at least one cholesteric liquid crystal optical body, as described above. The reflective polarizer 408 is provided to substantially transmit light of one polarization state exiting the light guide 418 and substantially reflect light of a different polarization state exiting the light guide 418.

Figure 11:
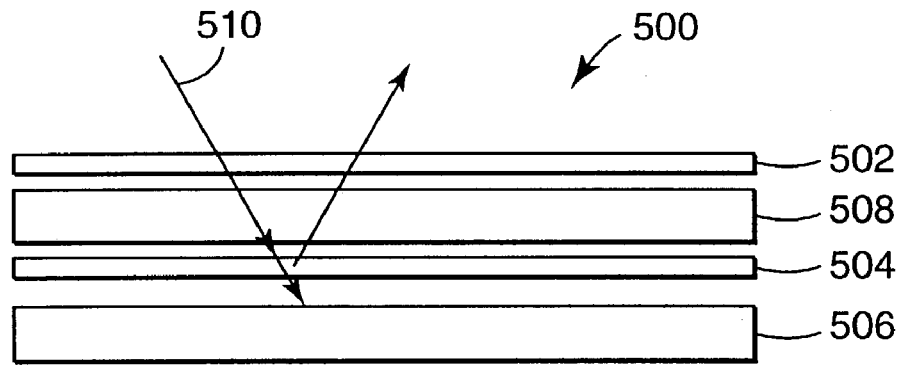
FIG. 11 is a schematic illustration of another embodiment of a liquid crystal display, according to the invention.

FIG. 11 is a schematic illustration of one type of reflective liquid crystal display 500. This reflective liquid crystal display 500 includes a display medium 508, a cholesteric liquid crystal reflective polarizing mirror 504, an absorptive backing 506, and an absorptive polarizer 502. The liquid crystal display 500 optionally includes a wave plate as part of the cholesteric liquid crystal reflective polarizer 504 or as a separate component to convert mixed polarization light from the liquid crystal device to an appropriately polarized light.

Liquid crystal display 500 functions first by the absorptive polarizer 502 polarizing light 510. The polarized light then travels through the display medium 508 where one of the light's circular polarization components reflects from the cholesteric liquid crystal reflective polarizing mirror 504 and passes back through the display medium 508 and absorptive polarizer 502. The other circular polarization component passes through the cholesteric liquid crystal reflective polarizer 504 and is absorbed by the backing 506. The reflective polarizer 504 of this reflective liquid crystal display 500 includes one cholesteric liquid crystal optical body, as described above. The specific choice of cholesteric liquid crystal optical body can depend on factors such as, for example, cost, size, thickness, materials, and wavelength range of interest.

Figure 12:
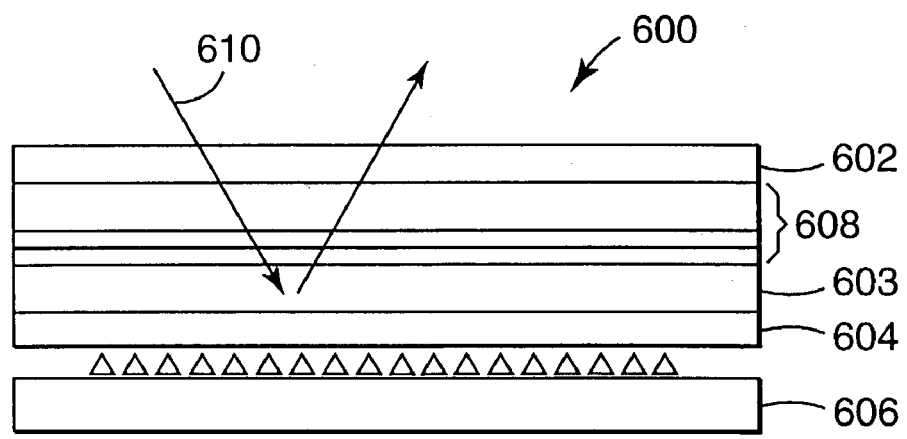
FIG. 12 is a schematic illustration of another embodiment of a liquid crystal display, according to the invention.

FIG. 12 is a schematic illustration of one type of transflective liquid crystal display 600. This transflective liquid crystal display 600 includes a phase retarding display medium 608, a partial mirror 603, a cholesteric liquid crystal reflective polarizing mirror 604, a backlight 606, and an absorptive polarizer 602. The display system optionally includes a wave plate as part of the cholesteric liquid crystal reflective polarizer 604 or as a separate component to convert mixed polarization light from the liquid crystal device to an appropriately polarized light. In the reflective mode, bright ambient light 610 is polarized by the absorptive polarizer 602, travels through the display medium 608, reflects off the partial mirror 603, and passes back through the display medium 608 and absorptive polarizer 602. In low ambient-light situations, the backlight 606 is activated and light is selectively passed through the cholesteric polarizer 604, matched to provide appropriately polarized light to the display. Light of the opposite handedness is back-reflected, recycled, and selectively passed through the cholesteric polarizer 604 to effectively increase backlight brightness. The reflective polarizer of this reflective liquid crystal display 600 includes one cholesteric liquid crystal optical body, as described above. The specific choice of cholesteric liquid crystal optical body can depend on factors such as, for example, cost, size, thickness, materials, and wavelength range of interest.

The cholesteric liquid crystal optical body can be used with a variety of other components and films that enhance or provide other properties to a liquid crystal display. Such components and films include, for example, brightness enhancement films, retardation plates including quarter-wave plates and films, multilayer or continuous/disperse phase reflective polarizers, metallized back reflectors, prismatic back reflectors, diffusely reflecting back reflectors, multilayer dielectric back reflectors, and holographic back reflectors.

EXAMPLES

Example 1

A coating solution was prepared for the coating procedure. 7.62 grams of cyanobiphenyl benzoate ethyl acrylate was polymerized with 0.74 grams of LC 756 in 25.1 grams of dioxolane (commercially available from Aldrich Chemical Co., Milwaukee, Wis.) using 0.27 grams of Vazo 52 (commercially available from Dupont, Wilmington, Del.) as a thermal initiator. This reaction was run for 16 hours at 60° C. This solution was then combined with 6 grams of cyclohexanone (commercially available from Aldrich Chemical Co., Milwaukee, Wis.), 12.2 grams of LC 242, 0.53 grams of LC 756, 2.0 grams of 4,4'-hydroxyl cyano biphenyl (commercially available from Aldrich Chemical Co., Milwaukee, Wis.) and 45.8 grams of dioxolane (commercially available from Aldrich Chemical Co., Milwaukee, Wis.).

The preparation of cyanobiphenyl benzoate ethyl acrylate is described in European Patent Application Publication No. 834754, which is incorporated herein by reference. The structure of cyanobiphenyl benzoate ethyl acrylate is:

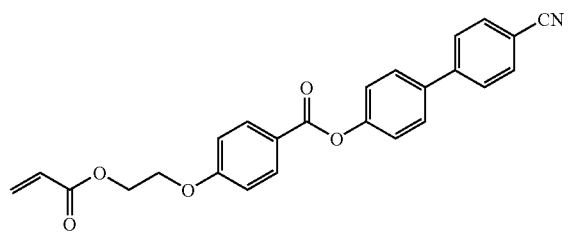

Compound LC 756 (Paliocolor™ LC 756 is commercially available from BASF) and Compound LC 242 (Paliocolor™ LC 242) are liquid crystal monomers available from BASF Corp. (Ludwigshafen, Germany). Vazo™ 52 (DuPont, Wilmington, Del.) is a thermally decomposable substituted azonitrile compound used as a free radical initiator.

This solution was coated on a 100 micrometer PET substrate (commercially available as Scotchpak™ from 3M, St. Paul, Minn.) using a wire round rod to produce a 4 micrometer thick dried coating.

Figure 13:
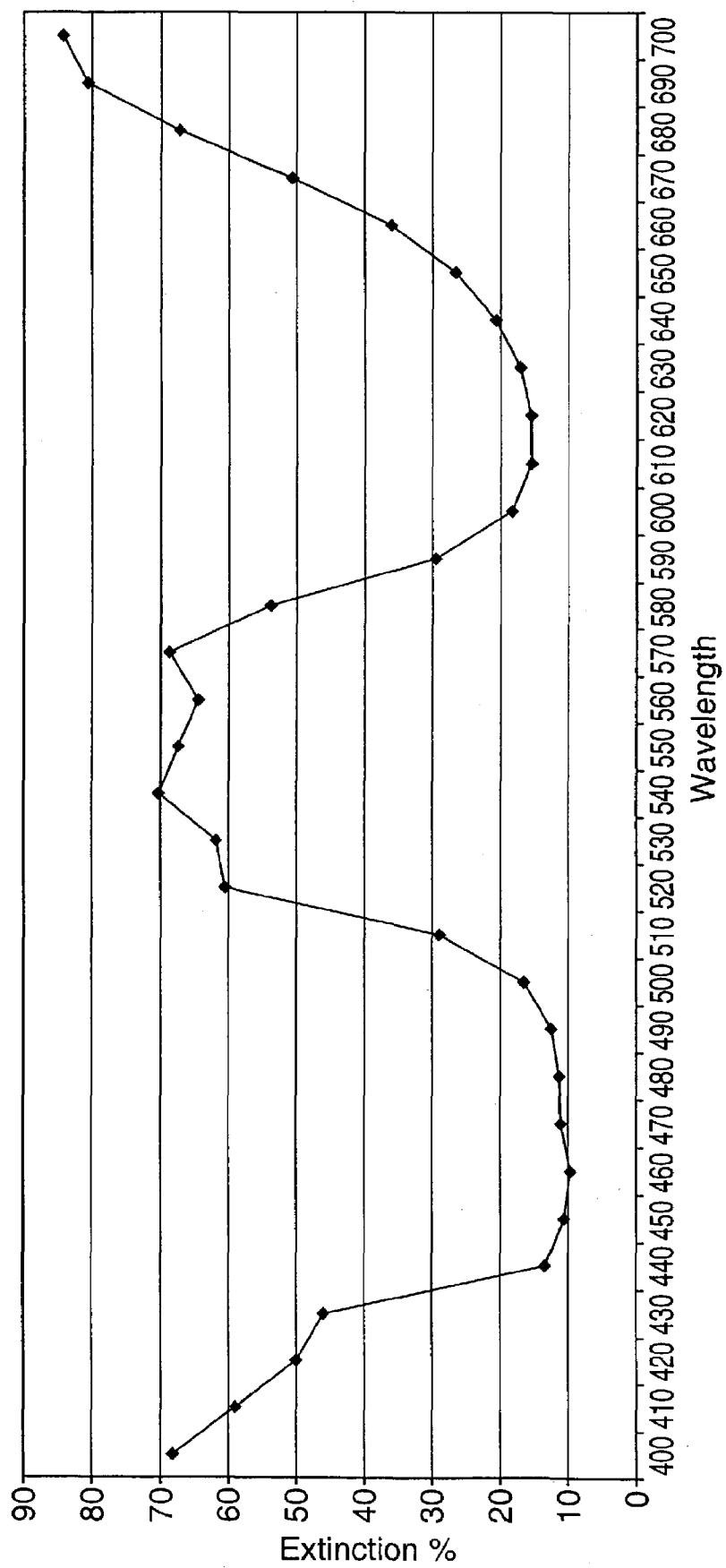
FIG. 13 is a light transmission spectrum of an optical body formed according to Example 1.

Finally, a Lambda™ 900 spectrophotometer (Perkin Elmer, Santa Clara, Calif.) was used to measure the optical performance of the optical body. A quarter-wave film was placed in front of the coating and a standard linear polarizer was placed in the light path and the transmission through the coating was measured in a range from 400 nm to 700 nm. The polarizer was rotated to give cross polarization and then transmission was measured. Two extinction peaks were seen. The results of this transmission over the measured wavelength range are illustrated in FIG. 13.

Example 2

A coating solution was prepared for the coating procedure. 8.21 grams of cyanobiphenyl benzoate ethyl acrylate was polymerized with 0.80 grams of LC 756 in 27.1 grams of dioxolane (commercially available from Aldrich Chemical Co., Milwaukee, Wis.) using 0.29 grams of Vazo 52 (commercially available from Dupont, Wilmington, Del.) as a thermal initiator. This reaction was run for 16 hours at 60° C. This solution was then combined with 15 grams of cyclohexanone (commercially available from Aldrich Chemical Co., Milwaukee, Wis.), 15.4 grams of LC 242, 0.64 grams of LC 756, 2.24 grams of 4'-hydroxy-1,1'-biphenyl-4-carbonitrile (commercially available from Aldrich Chemical Co., Milwaukee, Wis.), 27.1 grams of dioxolane (commercially available from Aldrich Chemical Co., Milwaukee, Wis.), 0.11 grams of butylated hydroxyl toluene (BHT is commercially available from Aldrich Chemical Co., Milwaukee, Wis.), 0.28 grams of Irgacure 819 (commercially available from Ciba Geigy, Hawthorne, N.Y.), and 0.84 grams of phenyl ethyl acrylate (commercially available from Polysciences, Warrington, Pa.).

This solution was coated on a 100 micrometer PET substrate using a wire round rod to produce a 5 micrometer thick dried coating. The coating was dried for 1 minute at 110° C. and then dried at 120° C. for twelve minutes forming the optical body. The dried coating was UV cured using a Fusion™ D lamp. The dose was approximately 1 J/cm².

Figure 14:
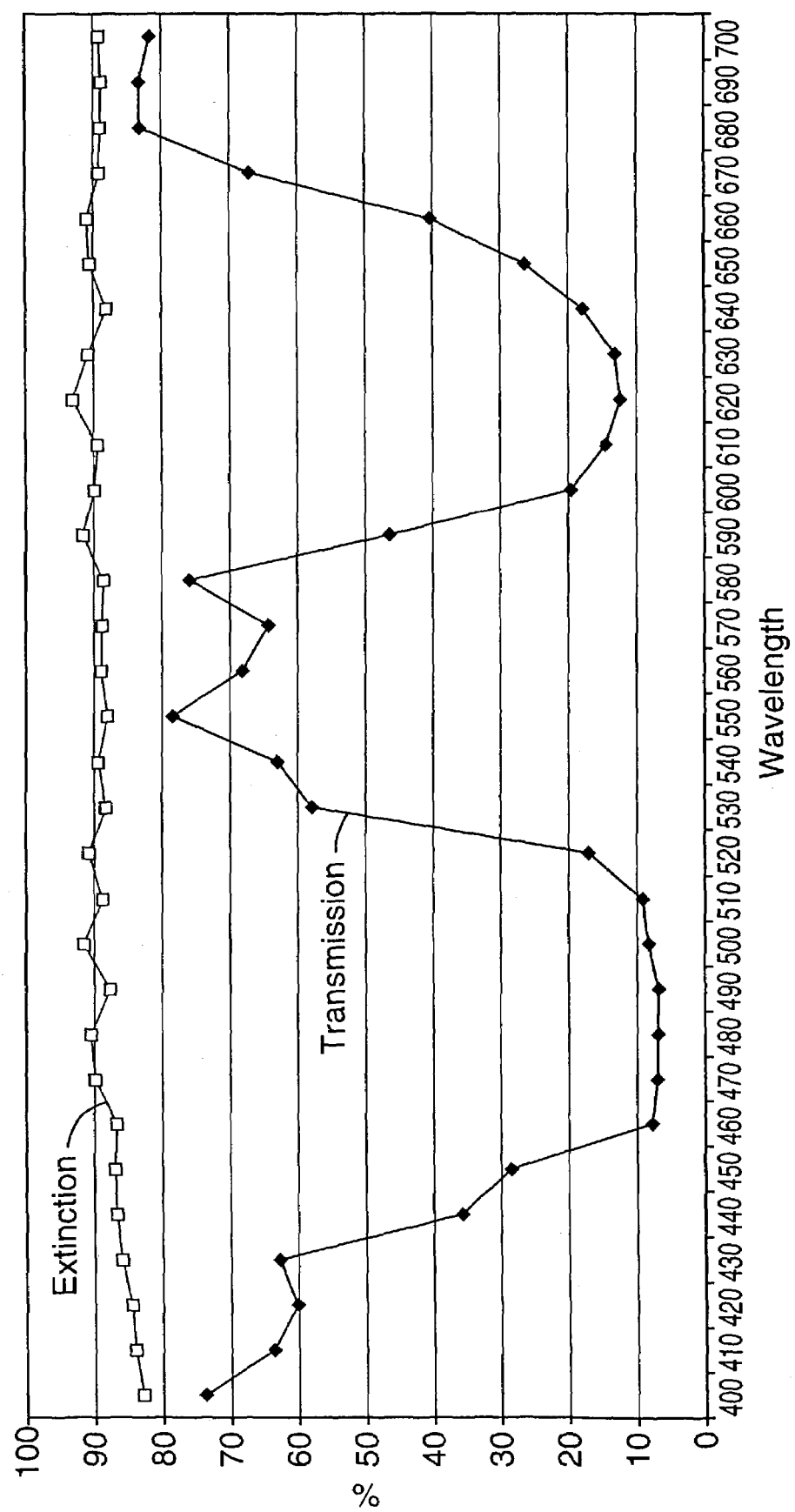
FIG. 14 is a light transmission spectrum of an optical body formed according to Example 2.

Finally, a Lambda™ 900 spectrophotometer (Perkin Elmer, Santa Clara, Calif.) was used to measure the optical performance of the optical body. A quarter-wave film was placed in front of the coating and a standard linear polarizer was placed in the light path and the transmission through the coating was measured in a range from 400 nm to 700 nm. The transmission was measured with the linear polarizer rotated both +45° and −45° from the quarter-wave film to give parallel and cross-polarization results. The results of this transmission over the measured wavelength range are illustrated in FIG. 14.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A method of making an optical body, the method comprising steps of:
    coating a mixture comprising a first cholesteric liquid crystal composition, a second cholesteric liquid crystal composition, and a solvent on a substrate; wherein the first cholesteric liquid crystal composition is different than the second cholesteric liquid crystal composition; and
    forming from the mixture a first layer disposed on the substrate and a second layer disposed on the first layer; wherein the first layer comprises a majority of the first cholesteric liquid crystal composition and the second layer comprises a majority of the second cholesteric liquid crystal composition.

2. The method according to claim 1, further comprising converting the first cholesteric liquid crystal composition into an aligned first cholesteric liquid crystal material and converting the second liquid crystal composition into an aligned second cholesteric liquid crystal material.

3. The method according to claim 2, wherein the step of converting the first and second cholesteric liquid crystal composition into an aligned first and second cholesteric liquid crystal material comprises polymerizing at least one of the first and second cholesteric liquid crystal composition.

4. The method according to claim 2, wherein the step of converting the first and second cholesteric liquid crystal composition into an aligned first and second cholesteric liquid crystal material comprises cross-linking at least one of the first and second cholesteric liquid crystal composition.

5. The method according to claim 2, wherein the step of converting the first and second cholesteric liquid crystal composition into an aligned first and second cholesteric liquid crystal material comprises heating at least one of the first and second cholesteric liquid crystal composition.

6. The method according to claim 2, further comprising coating a second mixture comprising a third cholesteric liquid crystal composition and a second solvent on the first or second cholesteric liquid crystal material; wherein the third cholesteric liquid crystal composition is different than the first or second cholesteric liquid crystal composition.

7. The method according to claim 6, further comprising converting the third cholesteric liquid crystal composition into an aligned third cholesteric liquid crystal material.

8. The method according to claim 2, further comprising;
    coating a second mixture comprising a third cholesteric liquid crystal composition, a fourth cholesteric liquid crystal composition, and a second solvent on the first or second cholesteric liquid crystal material; wherein the third cholesteric liquid crystal composition is different than the first, second or fourth cholesteric liquid crystal composition and the fourth cholesteric liquid crystal composition is different than the first, second or third cholesteric liquid crystal composition; and
    forming from the second mixture a third layer and a fourth layer on the first or second cholesteric liquid crystal material; wherein the third layer comprises a majority of the third cholesteric liquid crystal composition and the fourth layer comprises a majority of the fourth cholesteric liquid crystal composition.

9. The method according to claim 8, further comprising converting the third cholesteric liquid crystal composition into an aligned third cholesteric liquid crystal material and converting the fourth liquid crystal composition into an aligned fourth cholesteric liquid crystal material.

10. The method according to claim 1, wherein the step of forming a first layer and a second layer on the substrate comprises separating the first cholesteric liquid crystal composition front the second cholesteric liquid crystal composition.

11. The method according to claim 1, wherein the step of forming a first layer and a second layer on the substrate comprises removing at least a portion of the solvent from the mixture.

12. The method according to claim 1, wherein the step of forming a first layer and a second layer on the substrate comprises heating the mixture.

13. The method according to claim 1, further comprising curing the first or second cholesteric liquid crystal material.

14. A method of making an optical body, the method comprising steps of:
    coating a mixture comprising a first cholesteric liquid crystal composition, a second cholesteric liquid crystal composition, and a solvent on a substrate; wherein the first cholesteric liquid crystal composition comprises a cholesteric liquid crystal polymer and the second cholesteric liquid crystal composition comprises a cholesteric liquid crystal monomer; and forming from the mixture a first layer disposed on the substrate and a second layer disposed on the first layer; wherein the first layer comprises a majority of the first cholesteric liquid crystal composition and the second layer comprises a majority of the second cholesteric liquid crystal composition.

15. The method according to claim 14, further comprising converting the first cholesteric liquid crystal composition into an aligned first cholesteric liquid crystal material and converting the second liquid crystal composition into an aligned second cholesteric liquid crystal material.

16. The method according to claim 15, wherein the step of converting the first cholesteric liquid crystal composition into an aligned first cholesteric liquid crystal material comprises polymerizing the first cholesteric liquid crystal composition.

17. The method according to claim 15, wherein the step of converting the second cholesteric liquid crystal composition into an aligned second cholesteric liquid crystal material comprises cross-linking the second cholesteric liquid crystal composition.

18. The method according to claim 15, further comprising coating a second mixture comprising a third cholesteric liquid crystal composition and a second solvent on the first or second cholesteric liquid crystal material; wherein the third cholesteric liquid crystal composition comprises a cholesteric liquid crystal polymer or a cholesteric liquid crystal monomer and is different than the first or second cholesteric liquid crystal composition.

19. The method according to claim 18, further comprising converting the third cholesteric liquid crystal composition into an aligned third cholesteric liquid crystal material.

20. The method according to claim 19, wherein the step of converting the third cholesteric liquid crystal composition into an aligned third cholesteric liquid crystal material comprises converting the third cholesteric liquid crystal composition into an aligned third cholesteric liquid crystal thermoplastic material onto an aligned cholesteric liquid crystal cross-linked material.

21. The method according to claim 19, further comprising;

coating a second mixture comprising a third cholesteric liquid crystal composition, a fourth cholesteric liquid crystal composition, and a second solvent on the first or second cholesteric liquid crystal material; wherein the third cholesteric liquid crystal composition comprises a cholesteric liquid crystal polymer and the fourth cholesteric liquid crystal composition comprises a cholesteric liquid crystal monomer, wherein the third cholesteric liquid crystal composition is different than the first, second or fourth cholesteric liquid crystal composition and the fourth cholesteric liquid crystal composition is different than the first, second or third cholesteric liquid crystal composition; and forming from the second mixture a third layer and a fourth layer on the first or second cholesteric liquid crystal material; wherein the third layer comprises a majority of the third cholesteric liquid crystal composition and the fourth layer comprises a majority of the fourth cholesteric liquid crystal composition.

22. The method according to claim 21, further comprising converting the third cholesteric liquid crystal composition into an aligned third cholesteric liquid crystal material and converting the fourth liquid crystal composition into an aligned fourth cholesteric liquid crystal material.

23. The method according to claim 22, wherein the step converting the third cholesteric liquid crystal composition into an aligned third cholesteric liquid crystal material comprises converting the third cholesteric liquid crystal composition into an aligned third cholesteric liquid crystal thermoplastic material on an aligned second cholesteric liquid crystal cross-linked material.

24. The method according to claim 22, wherein the step converting the fourth cholesteric liquid crystal composition into an aligned fourth cholesteric liquid crystal material comprises converting the fourth cholesteric liquid crystal composition into an aligned fourth cholesteric liquid crystal cross-linked material on an aligned third cholesteric liquid crystal thermoplastic material.

25. The method according to claim 14, wherein the step of forming from the mixture a first layer and a second layer on the substrate comprises forming a first layer between the substrate and second layer.

26. The method according to claim 14, wherein the step of forming from the mixture a first layer and a second layer on the substrate comprises forming a second layer between the substrate and first layer.

* * * * *

UNITED STATES PATENT AND TRADEMARK OFFICE
CERTIFICATE OF CORRECTION

PATENT NO. : 7,068,344 B2
APPLICATION NO. : 10/373126
DATED : June 27, 2006
INVENTOR(S) : Richard J. Pokorny It is certified that error appears in the above-identified patent and that said Letters Patent is hereby corrected as shown below:

On the title page

Page 2,
Col. 1 (U.S. Patent Documents), Line 13, After "6,316,170" delete "B1" and insert -- B2 --, therefor.

Column 4,
Line 62, Delete "aligmnent)" and insert -- alignment) --, therefor.

Column 6,
Line 60, Delete "relective" and insert -- reflective --, therefor.

Column 8,
Line 7, Delete "Toyko," and insert -- Tokyo, --, therefor.
Lines 9-10, Delete "terphathalate" and insert -- terphthalate --, therefor.

Column 10,
Line 64, Delete "than" and insert -- then --, therefor.

Column 11,
Line 14, Delete "temperatures) this" and insert -- temperatures). This --, therefor.

Column 13,
Column 63, Delete "may contains" and insert -- may contain --, therefor.

Column 14,
Line 27, Delete "may contains" and insert -- may contain --, therefor.

Column 15,
Line 10, Delete "third, layer" and insert -- third layer --, therefor.
Line 22, Delete "may contains" and insert -- may contain --, therefor.
Line 52, Delete "may contains" and insert -- may contain --, therefor.

Column 20,
Line 5, In Claim 3, delete "composition." and insert -- compositions. --, therefor.
Line 10, In Claim 4, delete "composition." and insert -- compositions. --, therefor.
Line 13, In Claim 5, delete "composition" and insert -- compositions --, therefor.
Line 14, In Claim 5, delete "material" and insert -- materials --, therefor.

UNITED STATES PATENT AND TRADEMARK OFFICE
CERTIFICATE OF CORRECTION

PATENT NO. : 7,068,344 B2
APPLICATION NO. : 10/373126
DATED : June 27, 2006
INVENTOR(S) : Richard J. Pokorny It is certified that error appears in the above-identified patent and that said Letters Patent is hereby corrected as shown below:

Column 20, (cont'd)
Line 15, In Claim 5, delete "composition." and insert -- compositions. --, therefor.
Line 21, In Claim 6, delete "composition." and insert -- compositions. --, therefor.
Line 31, In Claim 8, delete "or" and insert -- and --, therefor.
Line 32, In Claim 8, delete "composition" and insert -- compositions --, therefor.
Line 33, In Claim 8, delete "or" and insert -- and --, therefor.
Line 34, In Claim 8, delete "composition;" and insert -- compositions; --, therefor.
Line 49 (approx.), In Claim 10, delete "front" and insert -- from --, therefor.
Line 60, In Claim 13, delete "material." and insert -- materials. --, therefor.

Column 21,
Line 30, In Claim 18, delete "or" and insert -- and --, therefor.
Line 31, In Claim 18, delete "composition." and insert -- compositions. --, therefor.

Column 22,
Line 7, In Claim 21, delete "or" and insert -- and --, therefor.
Lines 7-8, In Claim 21, delete "composition" and insert -- compositions --, therefor.
Line 9, In Claim 21, delete "or" and insert -- and --, therefor.
Line 10, In Claim 21, delete "composition;" and insert -- compositions; --, therefor.
Line 39, In Claim 25, delete "a" and insert -- the --, therefor.
Line 40, In Claim 25, after "and" insert -- the --.
Line 43, In Claim 26, delete "a" and insert -- the --, therefor.
Line 44, In Claim 26, after "and" insert -- the --.

Signed and Sealed this

Thirteenth Day of March, 2007

JON W. DUDAS
*Director of the United States Patent and Trademark Office*